(12) United States Patent
Sasaki (10) Patent No.: US 12,549,045 B2
(45) Date of Patent: Feb. 10, 2026

(54) ELECTRIC WATER PUMP

(71) Applicant: Hitachi Astemo, Ltd., Hitachinaka (JP)

(72) Inventor: Keita Sasaki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/811,487

(22) Filed: Aug. 21, 2024

(65) Prior Publication Data

US 2025/0088053 A1    Mar. 13, 2025

(30) Foreign Application Priority Data

Sep. 8, 2023    (JP) ................................. 2023-145716

(51) Int. Cl.
*H02K 1/28*    (2006.01)
*H02K 5/02*    (2006.01)
*H02K 7/14*    (2006.01)

(52) U.S. Cl.
CPC ................ *H02K 1/28* (2013.01); *H02K 5/02* (2013.01); *H02K 7/14* (2013.01)

(58) Field of Classification Search
CPC ... H02K 1/28; H02K 5/02; H02K 7/14; F04D 13/06; F04D 13/064; F04D 25/06; F04D 25/04; F04D 25/0606; F04D 25/0613; F04D 25/0633; F04D 25/0646; F04C 2240/00; F04C 2240/10; F04C 2240/40
See application file for complete search history.

(56) References Cited

U.S. PATENT DOCUMENTS

| | | | |
|---|---|---|---|
| 7,876,013 B2 * | 1/2011 | Okubo | H02K 1/278 310/156.47 |
| 8,067,864 B2 * | 11/2011 | Beetz | B04B 9/04 251/129.1 |
| 11,434,911 B2 * | 9/2022 | Otsuki | F04D 13/06 |
| 12,326,147 B2 * | 6/2025 | Wan | F04C 11/008 |
| 2009/0001838 A1 * | 1/2009 | Okubo | H02K 29/08 310/156.16 |
| 2009/0001839 A1 * | 1/2009 | Masayuki | H02K 29/08 310/156.16 |
| 2018/0351429 A1 * | 12/2018 | Yukawa | H02K 1/185 |
| 2019/0013747 A1 * | 1/2019 | Barletta | H02K 1/04 |
| 2023/0261534 A1 * | 8/2023 | Suzuki | H02K 1/28 310/156.22 |
| 2023/0336041 A1 * | 10/2023 | Suzuki | H02K 1/28 |

FOREIGN PATENT DOCUMENTS

JP    2022-165783 A    11/2022

* cited by examiner

*Primary Examiner* — Dapinder Singh
(74) *Attorney, Agent, or Firm* — FOLEY & LARDNER LLP (57) ABSTRACT

An electric water pump includes a motor housing including an inner wall, an outer wall, and a connection wall. The inner wall has a bottomed tubular shape and forms a first accommodation space inside for accommodating a rotor. The outer wall has a tubular shape, encompasses the inner wall, and forms a second accommodation space inside for accommodating a stator. The connection wall connects the inner wall to the outer wall radially at its impeller side. A stator holder includes a base portion and holding portions. The base portion has an annular shape and is fixed to an outer axial end portion of the outer wall. Each holding portion has a first axial end portion fixed to the base portion and a second axial end portion in elastic contact with the stator, and holds the stator.

7 Claims, 7 Drawing Sheets

ELECTRIC WATER PUMP

BACKGROUND

The present invention relates to an electric water pump.

Japanese Patent Application Publication No. 2022-165783 (JP 2022-165783 A) discloses an electric water pump. The electric water pump includes: a support member made of a nonmagnetic resin material to have a generally disc shape; a cover member having a cup shape, and covering an axial end portion of the support member; a fixation member made of metal to have a cylindrical shape, and provided at an upper end portion of the support member; a fixation shaft inserted and arranged inside a cylindrical extension portion of a resin part provided at the center of the support member; a rotor arranged radially outside an axial end portion of the fixation shaft, facing the axial end portion of the fixation shaft via the extension portion; a pump section disposed at another axial end portion of the fixation shaft; and a stator having a cylindrical shape, disposed radially outside the rotor, and provided at a base portion of the support member via the fixation member. The stator is pressed inside an inner peripheral face of the fixation member, and bolted to the support member via a stay portion of a lower end portion of the fixation member. This restricts a position of the stator in a thrust direction and a position of the stator in a radial direction.

SUMMARY

For assembling the electric water pump described above, the stator is mounted to the support member by first fixing the stator to the inside of the fixation member made of metal by press fitting, and thereafter fixing the stay portion of the fixation member to the support member by bolts. This requires management of complicated assembling operations, and many working operations, thereby adversely affecting the workability of assembling and increasing the cost of working.

In view of the foregoing, it is desirable to provide an electric water pump, where a stator can be easily mounted to a motor housing with simplified assembling operations without management of complicated assembling operations.

According to one or more embodiments, an electric water pump includes: an impeller; a rotor coupled with the impeller; a stator arranged coaxially with the rotor; a motor housing structured to accommodate the rotor and the stator; and a stator holder structured to hold the stator; wherein the motor housing includes an inner wall, an outer wall, and a connection wall; wherein the inner wall has a bottomed tubular shape and forms a first accommodation space radially inside the inner wall, wherein the first accommodation space accommodates the rotor; wherein the outer wall has a tubular shape, is arranged radially outside the inner wall, encompasses the inner wall, and forms a second accommodation space between the inner wall and the outer wall, wherein the second accommodation space has a tubular shape and accommodates the stator; wherein the connection wall connects a first axial end portion of the inner wall to a first axial end portion of the outer wall radially, wherein the first axial end portion of the inner wall faces the impeller, and wherein the first axial end portion of the outer wall faces the impeller; wherein the stator holder includes a base portion and holding portions; wherein the base portion has an annular shape and is fixed to an outer axial end portion of the outer wall opposite to the first axial end portion of the outer wall; and wherein each of the holding portions has a first axial end portion fixed to the base portion and a second axial end portion in elastic contact with the stator, and is structured to hold the stator.

The electric water pump may be configured such that each of the holding portions includes a leg portion extending to an axial end portion of the stator. The electric water pump may be configured such that: each of the holding portions includes a pair of slits on respective sides of the first axial end portion of the each of the holding portions; and the pair of slits extend radially and allow the first axial end portion of the each of the holding portions to be deformed axially. The electric water pump may be configured such that: each of the holding portions is provided with a projecting portion of the base portion; the projecting portion is located radially outside of the first axial end portion of each of the holding portions, and projects radially outwardly; and each of the pair of slits extends from the respective side of the first axial end portion of the each of the holding portions into a predetermined proximity to the projecting portion. The electric water pump may be configured such that: the motor housing is integrally formed of synthetic resin; the stator holder is integrally formed of synthetic resin; and the base portion of the stator holder is welded to the outer axial end portion of the outer wall. The electric water pump may be configured such that: the outer axial end portion of the outer wall includes an outer face including at least two grooves; each of the at least two grooves extends tangentially of the outer wall; the stator holder includes at least two mount portions at an outer periphery of the base portion; each of the at least two mount portions includes a first end face facing the stator, wherein the first end face is formed with a fitting projection; and the fitting projection is structured to be radially inserted into, fitted with, and welded to a corresponding one of the at least two grooves of the outer wall. The electric water pump may be configured such that: each of the at least two mount portions includes a second end face opposite to the first end face, wherein the second end face is provided with columns; each of the columns corresponds in position to the fitting projection as viewed axially; and each of the columns includes a tip end portion provided with an engaging portion structured to be inserted into and elastically engaged with a fixation hole formed in a circuit board. The electric water pump may be configured such that: the stator holder includes a tubular wall extending axially from an inner periphery of the base portion toward an axial end portion of the stator; and the tubular wall is structured to be axially inserted radially inside the outer end portion of the outer wall, and fitted with an inner peripheral face of the outer end portion of the outer wall. The electric water pump may be configured such that: the outer wall includes an inner peripheral face facing the second accommodation space; the inner peripheral face of the outer wall includes a recess extending axially; the stator includes an outer peripheral face including a projection projecting radially and extending axially; and the recess of the outer wall and the projection of the stator are structured to allow the projection of the stator to be inserted axially into and fitted with the recess of the outer wall. The electric water pump may be configured such that the motor housing, the rotor, and the stator form a three-phase brushless electric motor.

BRIEF DESCRIPTION OF THE DRAWINGS

FIGS. 6A and 6B are perspective views showing a part of the stator holder according to the embodiment, wherein the part includes a base portion and a leg portion, wherein FIG. 6A shows an inner peripheral side of the part, and wherein FIG. 6B shows an outer peripheral side of the part.

DETAILED DESCRIPTION

Figure 1:
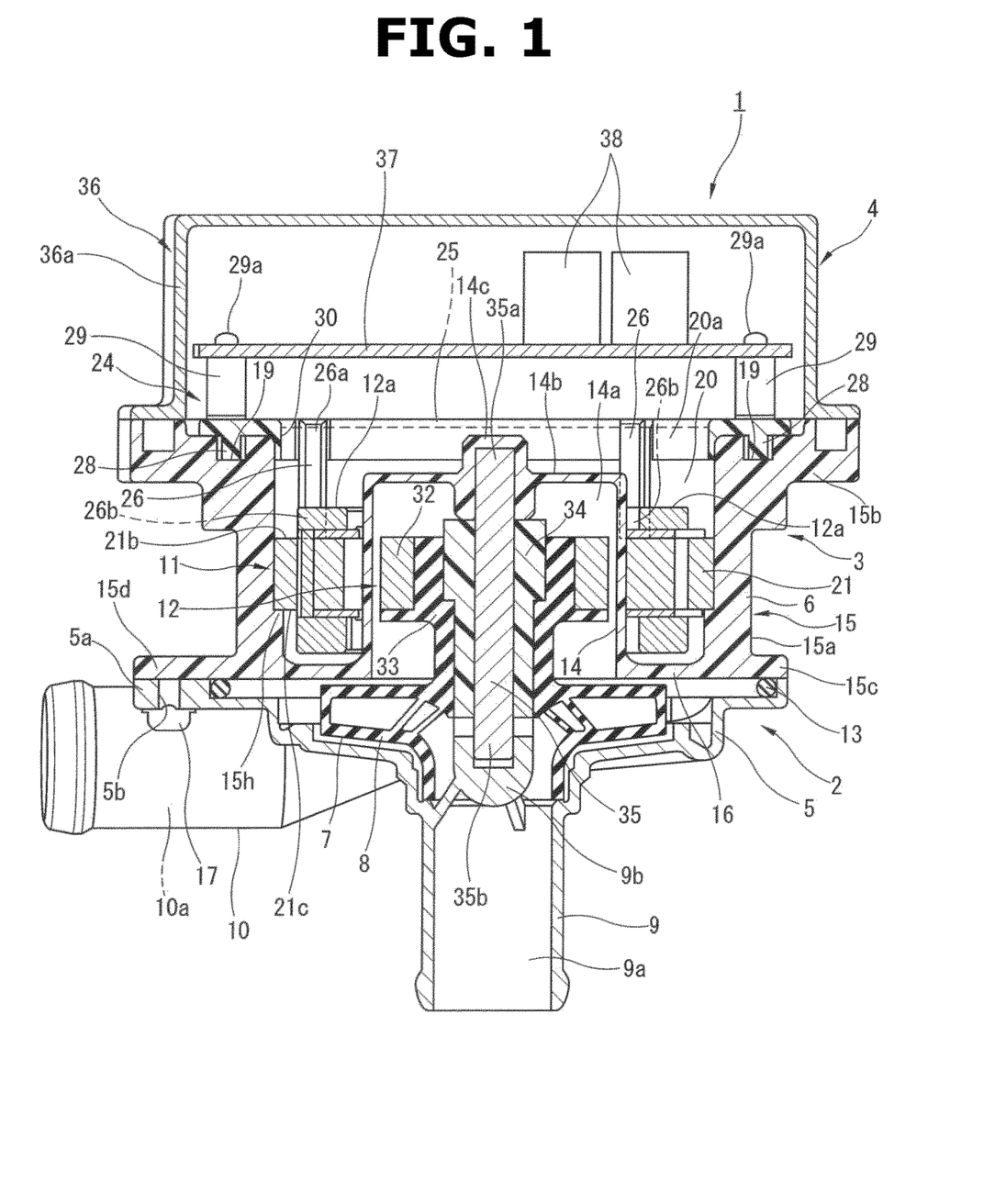
FIG. 1 is a longitudinal sectional view of an electric water pump according to an embodiment of the present invention.
Figure 2:
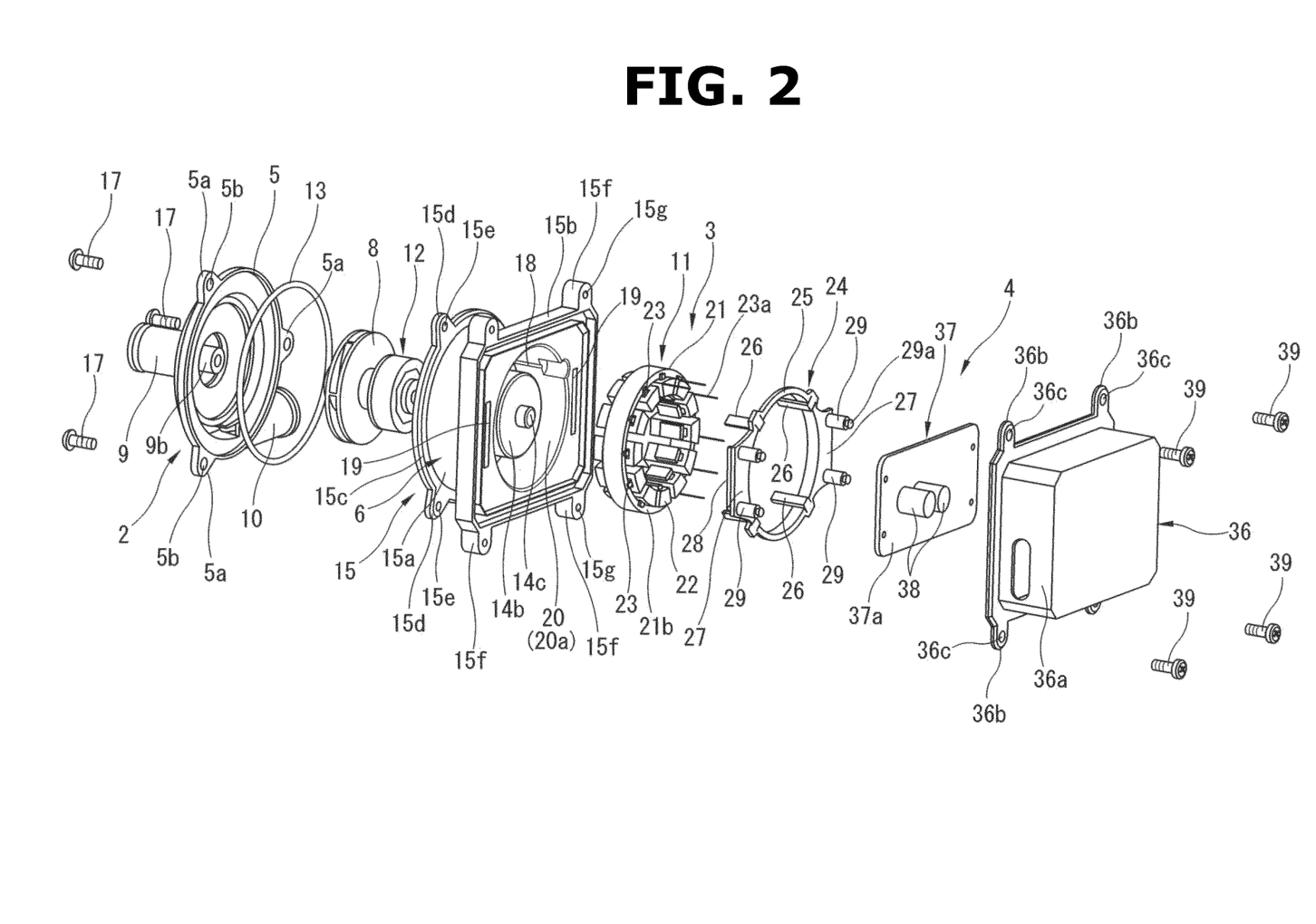
FIG. 2 is an exploded perspective view of the electric water pump according to the embodiment.
Figure 3:
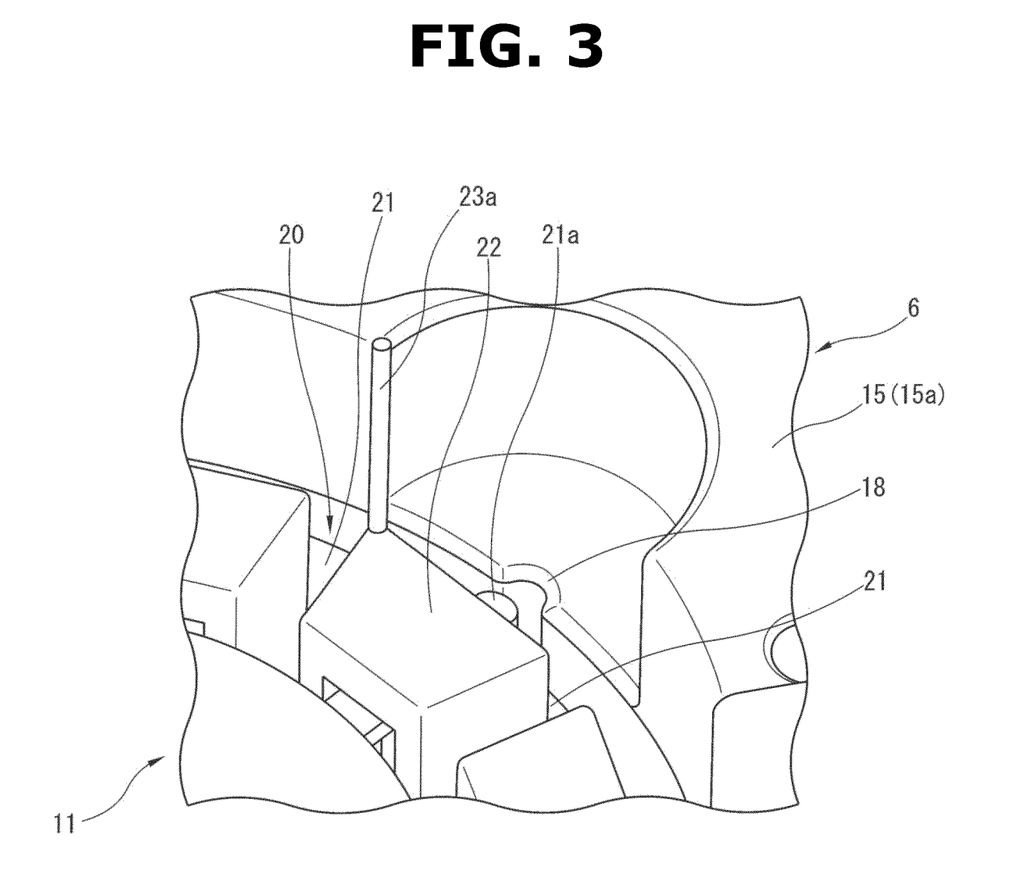
FIG. 3 is a partial perspective view of the electric water pump according to the embodiment, showing a recess formed in a motor housing and a projection formed in a stator core.

FIG. 1 shows a longitudinal sectional view of an electric water pump according to an embodiment of the present invention. FIG. 2 shows an exploded perspective view of the electric water pump according to the embodiment. FIG. 3 shows a partial perspective view of the electric water pump according to the embodiment, showing a recess formed in a motor housing and a projection formed in a stator core.

An electric water pump 1 is employed to form a cooling system for an automotive vehicle or the like. The electric water pump 1 is arranged in a hydraulic circuit for circulating working fluid, and structured to pump a cooling medium as working fluid, such as cooling water, wherein the hydraulic circuit is connected to a heat exchanger such as a radiator. In this example, the electric water pump 1 supplies cooling water to an internal combustion engine, a driving motor, an inverter, etc., of a hybrid electric vehicle.

As shown in FIG. 1, the electric water pump 1 includes: a pump section 2; an electric motor section 3 as a drive section to drive the pump section 2; and a control section 4 configured to control behavior of the electric motor section 3. In FIG. 1, the pump section 2 is arranged in a lower section, the electric motor section 3 is arranged in an intermediate section, and the control section 4 is arranged in an upper section. This arrangement is a non-limiting example, and may be modified arbitrarily depending on specifications and location of the electric water pump 1. Specifically, the pump section 2, the electric motor section 3, and the control section 4 may be arranged in a transverse direction, or in a direction inversed from the direction of arrangement of FIG. 1.

As shown in FIG. 1, the pump section 2 includes: a pump housing 5; a motor housing 6; a pump chamber 7 formed between the pump housing 5 and the motor housing 6; and an impeller 8 accommodated in the pump chamber 7. The pump housing 5 is made of metal or the like, and includes a suction pipe 9 extending along a rotation axis of the impeller 8. The suction pipe 9 forms a suction passage 9a having an opening facing the pump chamber 7. The pump housing 5 has a side part provided with a discharge pipe 10 forming a discharge passage 10a that extends radially and communicates with the pump chamber 7. As shown in FIG. 2, the pump housing 5 includes an outer periphery formed integrally with a plurality of boss portions 5a (three in this example) arranged at intervals of 120 degrees. Each boss portion 5a is a U-shaped plate. Each boss portion 5a has a central portion including a bolt hole 5b extending through. A seal ring 13 is disposed between the pump housing 5 and the motor housing 6 to seal therebetween.

The impeller 8 of the pump section 2 is rotationally driven by the electric motor section 3 to suck cooling water via the suction passage 9a of the suction pipe 9 into the pump chamber 7, and discharge the cooling water radially, and supply the cooling water to the internal combustion engine or the like through the discharge passage 10a of the discharge pipe 10.

The electric motor section 3 forms an inner rotor type brushless electric motor. As shown in FIGS. 1 and 2, the electric motor section 3 includes a motor housing 6, a stator 11, and a rotor 12. The motor housing 6 is coupled with an upper end portion of the pump housing 5 by a plurality of bolts 17 (thee bolts in this example). Each bolt 17 is inserted into the corresponding bolt hole 5b of the boss portion 5a. The stator 11 and the rotor 12 are accommodated in the motor housing 6. The rotor 12 is arranged radially inside the stator 11, and structured to rotate with respect to the stator 11.

The motor housing 6 is made of synthetic resin entirely to have a generally cylindrical tubular shape. The motor housing 6 includes an inner wall 14, an outer wall 15, and a connection wall 16. The inner wall 14 forms an accommodation space 14a for accommodating the rotor 12. The outer wall 15 is arranged radially outside the inner wall 14 to encompass the inner wall 14. The connection wall 16 has a thin annular shape, and connects an axial end portion of the inner wall 14 closer to the impeller 8 and an axial end portion of the outer wall 15 closer to the impeller 8, radially of the electric water pump 1.

The inner wall 14 is formed to have a thin bottomed cylindrical tubular shape. As shown in FIG. 1, the inner wall 14 includes an upper end wall portion 14b having a generally circular plate shape. At the center of the upper end wall portion 14b, a fixation portion 14c is formed to have a bottomed cylindrical tubular shape. An upper end portion 35a of a support shaft 35, which is an end portion of the support shaft 35 in the axial direction, is inserted into and fixed to the fixation portion 14c. The accommodation space 14a of the inner wall 14 has a cylindrical tubular shape having a relatively large diameter for accommodating the rotor 12.

As shown in FIG. 1, the outer wall 15 includes a base wall portion 15a, a plate wall portion 15b, an annular peripheral portion 15c, and three boss portions 15d. The base wall portion 15a is formed to have a thick cylindrical tubular shape. The plate wall portion 15b is formed integrally with an upper end portion of the base wall portion 15a, and has a generally square shape. The annular peripheral portion 15c is formed integrally with an outer periphery of a lower end portion of the base wall portion 15a, in FIG. 1. The boss portions 15d are arranged at an outer periphery of the annular peripheral portion 15c, circumferentially at intervals of 120 degrees. Each boss portion 15d has an internal thread hole 15e at the center, wherein the internal thread hole 15e extends through the boss portion 15d. The three bolts 17, which are inserted through the bolt holes 5b of the boss portions 5a of the pump housing 5, are screwed into the internal thread holes 15e, thereby coupling the pump housing 5 with the motor housing 6.

As shown in FIG. 1, the base wall portion 15a of the outer wall 15 includes an inner peripheral face formed with a seat portion 15h located closer to the connection wall 16, wherein the seat portion 15h projects radially inwardly. A lower end face of an outer peripheral portion of a stator core 21 of the stator 11 is seated on the seat portion 15*h* of the outer wall 15. As shown in FIGS. 2 and 3, the inner peripheral face of the base wall portion 15*a* includes a recess 18 having a narrow width and extending in the axial direction. The recess 18 is fitted with a projection 21*a* of the stator core 21 to restrict rotation of the stator 11 in the circumferential direction, wherein the projection 21*a* projects radially outwardly from the outer periphery of the stator core 21.

As shown in FIG. 2, the plate wall portion 15*b* of the outer wall 15 includes four boss portions 15*f*, wherein two of the boss portions 15*f* are located at respective end portions of an upper edge portion of the plate wall portion 15*b*, and wherein the remaining two boss portions 15*f* are located at respective end portions of a lower edge portion of the plate wall portion 15*b*. Each boss portion 15*f* has a cylindrical column shape, and has an internal thread hole 15*g* extending in the axial direction, wherein a bolt 39 is screwed into the internal thread hole 15*g* to fix a control cover 36. The plate wall portion 15*b* has an upper end face formed with a pair of grooves 19 arranged on left and right sides, respectively, as shown in FIG. 2. Each groove 19 extends along the corresponding one of the left and right edges of the plate wall portion 15*b*, and has a rectangular cross section.

The connection wall 16 has an annular shape, and defines an accommodation space 20 between the inner wall 14 and the outer wall 15, wherein the accommodation space 20 has a cylindrical tubular shape.

The stator 11 is accommodated entirely in the accommodation space 20, and arranged coaxially with the rotor 12. The stator 11 includes the stator core 21, bobbins 22, and coils 23. The stator core 21 is made of a magnetic material to have an annular shape. The bobbins 22 are made of synthetic resin, and provided to the stator core 21. Each coil 23 is wound around the outer periphery of the corresponding bobbin 22. The stator core 21 has an inner periphery having teeth projecting radially inwardly to the outside of the bobbins 22, wherein the teeth are arranged in the circumferential direction.

Figure 4:
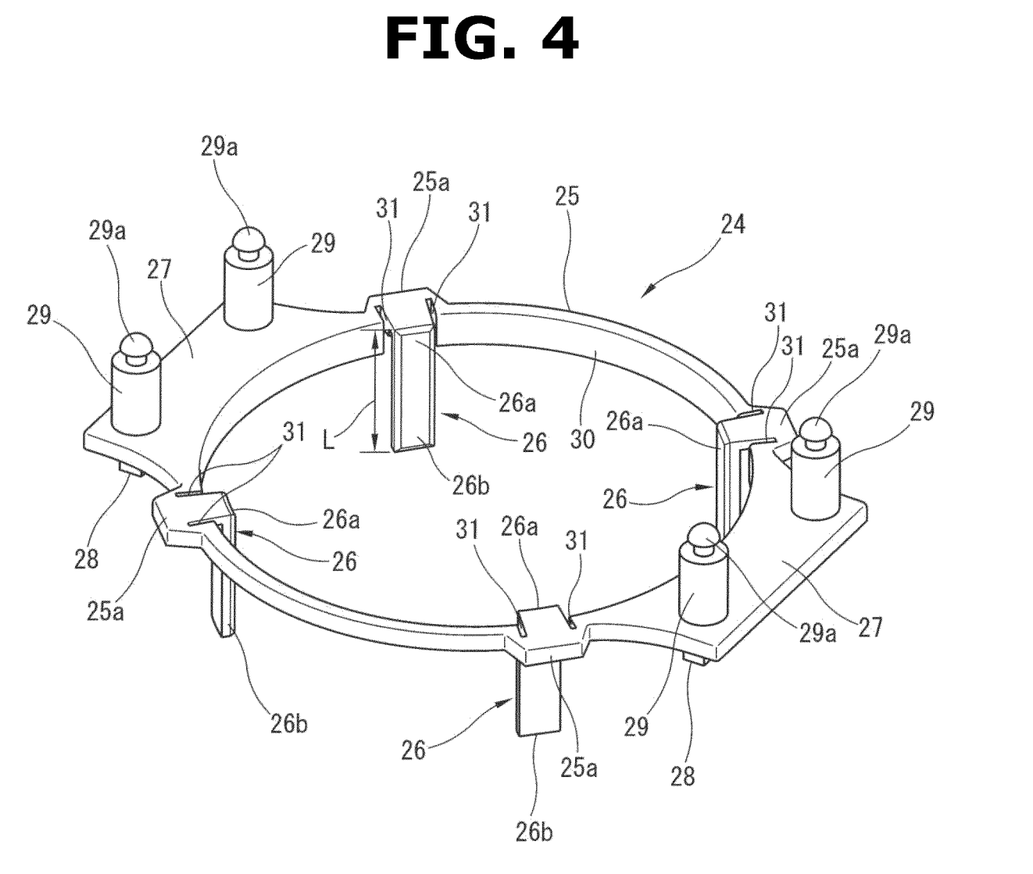
FIG. 4 is a perspective view of a stator holder according to the embodiment.
Figure 5:
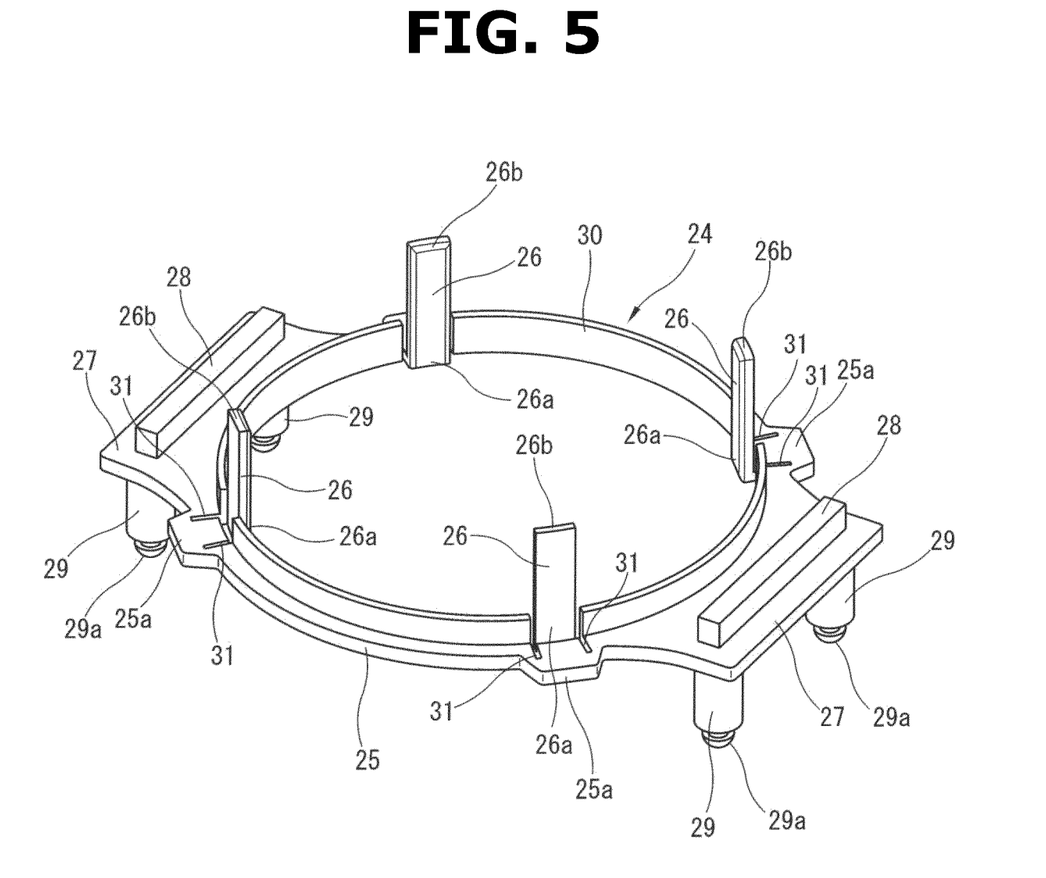
FIG. 5 is a perspective view of the stator holder according to the embodiment, showing a side of the stator holder opposite to a side of the stator holder shown in FIG. 4.
Figure 6A:
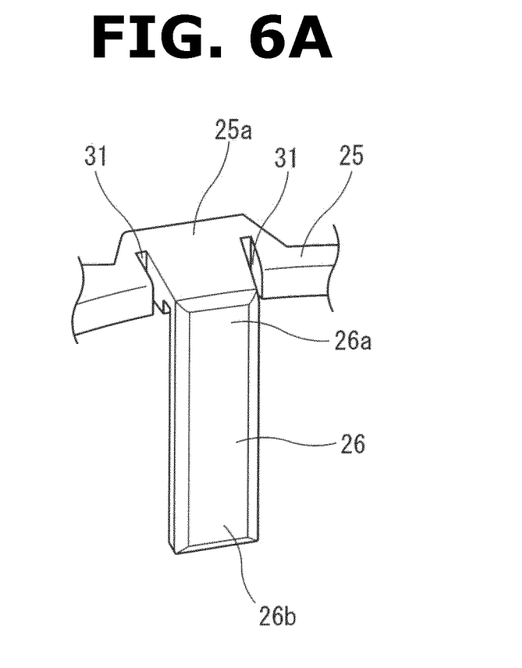
Figure 6B:
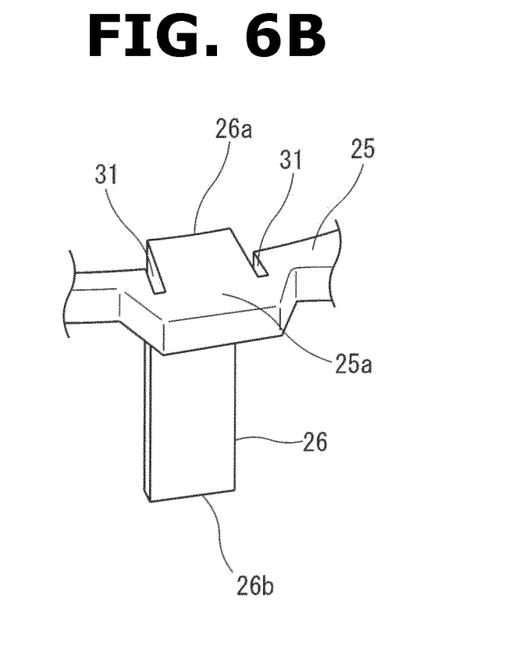
Figure 7:
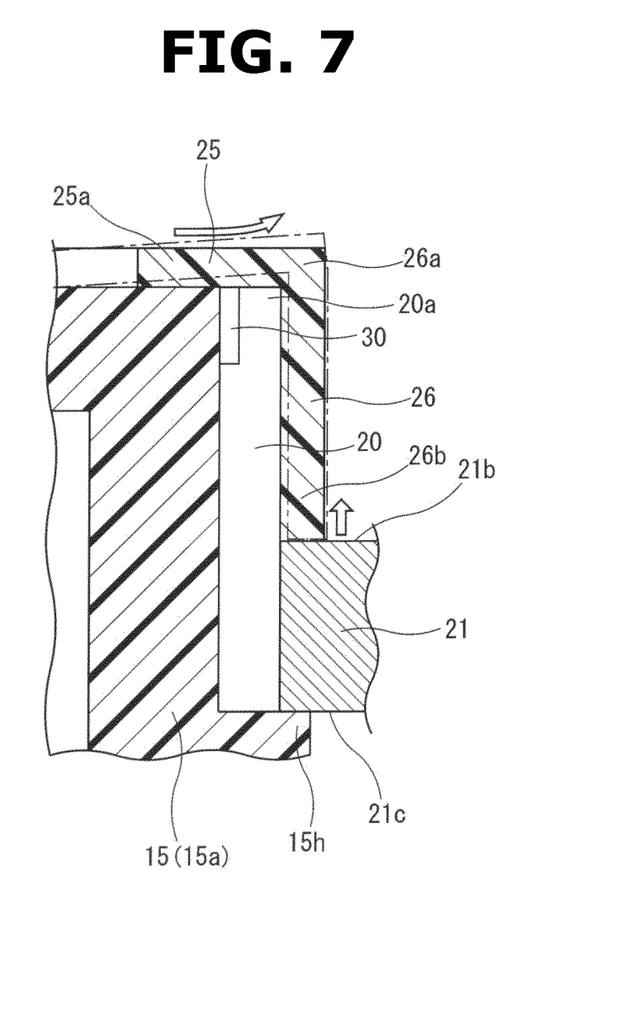
FIG. 7 is a sectional view showing a structure in which the leg portion of the stator holder includes a tip end portion pressed onto an upper end face of the stator core, and the base portion of the stator holder includes a part elastically deformed upwardly.

FIG. 4 shows a perspective view of a stator holder according to the embodiment. FIG. 5 shows a perspective view of the stator holder according to the embodiment, showing a side of the stator holder opposite to a side of the stator holder shown in FIG. 4. FIGS. 6A and 6B show perspective views showing a part of the stator holder according to the embodiment, wherein the part includes a base portion and a leg portion, wherein FIG. 6A shows an inner peripheral side of the part, and wherein FIG. 6B shows an outer peripheral side of the part. FIG. 7 shows a sectional view showing a structure in which the leg portion of the stator holder includes a tip end portion pressed onto an upper end face of the stator core, and the base portion of the stator holder includes a part elastically deformed upwardly.

As shown in FIG. 1, the stator 11 is accommodated in the accommodation space 20 between the inner wall 14 and the outer wall 15 of the motor housing 6, and positioned in the axial direction (in the thrust direction) and fixed by a stator holder 24.

The stator holder 24 is integrally formed of synthetic resin. As shown in FIGS. 2, 4 and 5, the stator holder 24 includes a base portion 25, four leg portions 26 as holding portions, two mount portions 27, two fitting projections 28, and four columns 29. The base portion 25 has an annular shape. The leg portions 26 are arranged in the circumferential direction of the base portion 25 at intervals of about 90 degrees. Each leg portion 26 has a fixed end portion 26*a* that is an axial end portion fixed to the base portion 25. The mount portions 27 are arranged in the circumferential direction of the base portion 25 at intervals of 180 degrees. Each mount portion 27 has a rectangular shape. Each fitting projection 28 is provided to a first end face of the corresponding mount portion 27 closer to the leg portions 26. Each mount portion 27 is provided with two columns 29 on a second end face of the mount portion 27 opposite to the first end face.

The base portion 25 has a relatively thin annular plate shape, and is provided with projecting portions 25*a*. Each projecting portion 25*a* is located at a portion of the outer periphery of the base portion 25 coupled with the fixed end portion 26*a* of the corresponding leg portion 26, and projects radially outwardly, and has a trapezoidal shape as viewed in the axial direction. As shown in FIG. 1, the base portion 25 is provided with a tubular wall 30 at the inner periphery of the underside closer to the leg portions 26, wherein the tubular wall 30 is fitted with the inner peripheral face of the outer axial end portion of the base wall portion 15*a* of the outer wall 15 of the motor housing 6, namely, the tubular wall 30 is fitted with the upper end opening 20*a* of the accommodation space 20 closer to the plate wall portion 15*b* of the outer wall 15 of the motor housing 6.

As shown in FIGS. 4 and 5, each leg portion 26 has a rectangular shape having a constant width and a relatively long length. The length L of the leg portion 26, which is a length from the fixed end portion 26*a* to a tip end portion 26*b* closer to the stator core 21, is set such that the tip end portion 26*b* is in elastic contact with the upper end face 21*b* of the stator core 21 in the axial direction, under a condition that the base portion 25 is in contact with the plate wall portion 15*b*.

As shown in FIGS. 4, 6A and 6B, the fixed end portion 26*a* of each leg portion 26 is formed with a pair of slits 31 on respective sides thereof, wherein each slit 31 extends from the base portion 25 to a point in proximity to the projecting portion 25*a*. Under a condition that the stator 11 is placed in the accommodation space 20, and thereafter the tip of each tip end portion 26*b* is pressed in the axial direction onto the upper end face 21*b* of the stator core 21, the portion of the base portion 25 close to each projecting portion 25*a* between the slits 31 is elastically deformed upwardly to apply an elastic force to each leg portion 26, as shown by imaginary lines in FIG. 7.

As shown in FIG. 5, each fitting projection 28 extends in a tangential direction of the base portion 25, namely, in the longitudinal direction of the corresponding mount portion 27, and has a rectangular cross section. Each fitting projection 28 is inserted axially into and fitted with the corresponding groove 19 of the motor housing 6. While being fitted with the groove 19, the fitting projection 28 is welded to the groove 19 by vibration welding. Specifically, under a condition that the base portion 25 is in contact with the periphery of the upper end opening 20*a* of the accommodation space 20, and each fitting projection 28 is fitted with the groove 19, and the tip end portion 26*b* of each leg portion 26 is in elastic contact with the upper end face 21*b* of the stator core 21, the fitting projection 28 and the groove 19 are welded together by vibration welding.

As shown in FIG. 4, each mount portion 27 is provided with two columns 29 located at and fixed to respective end portions in the longitudinal direction of the mount portion 27. Each column 29 has a cylindrical shape having a relatively small diameter, and has a fungiform head portion 29*a* that is structured to be elastically deformed radially inwardly. The fungiform head portion 29*a* is structured to be snap-fitted with and mechanically coupled with a corresponding one of four fixation holes 37a formed in a circuit board 37.

As shown in FIGS. 1 and 2, the rotor 12 has a generally cylindrical tubular shape, and has an outer periphery where permanent magnets 32 are held. The entire outer peripheral part of the rotor 12 including the permanent magnets 32 is molded by a magnetic pole holding portion 33 made of synthetic resin. The magnetic pole holding portion 33 has a cylindrical shaft portion at the inner periphery of the rotor 12, wherein the shaft portion of the magnetic pole holding portion 33 has a tip end portion formed integrally with the impeller 8. A tubular portion 34 is provided inside the magnetic pole holding portion 33, wherein the support shaft 35 is inserted in the tubular portion 34.

As shown in FIG. 1, the support shaft 35 has an upper end portion 35a and a lower end portion 35b in the axial direction. The upper end portion 35a is inserted into and fixed to the fixation portion 14c of the inner wall 14 of the motor housing 6. The lower end portion 35b is inserted into and fixed to a holding portion 9b of the suction pipe 9. The holding portion 9b is formed integrally with the suction pipe 9, is located in the suction passage 9a, and has a cup shape. The rotor 12 has an outer peripheral face that faces radially the inner peripheral face of the stator core 21 via the inner wall 14 and a cylindrical tubular air gap.

As shown in FIGS. 1 and 2, the control section 4 includes the control cover 36 and the circuit board 37. The control cover 36 is fixed to the upper face of the plate wall portion 15b of the outer wall 15 of the motor housing 6 by a plurality of bolts (four bolts in this example) 39. The circuit board 37 is fixed to the columns 29 of the stator holder 24.

The control cover 36 is made of a thermally conductive material such as an aluminum alloy to have a rectangular box shape, and serves as a heat sink. The control cover 36 includes an annular outer peripheral wall 36a that is in contact with and fixed by the four bolts 39 to the end face of the plate wall portion 15b of the motor housing 6. In other words, the control cover 36 has an outer peripheral portion closer to the plate wall portion 15b, wherein the outer peripheral portion is formed integrally with a flange portion projecting outwardly. The flange portion includes four boss portions 36b at respective four corners. Each boss portion 36b has a central portion formed with a bolt insertion hole 36c, wherein the bolt 39 is inserted through the bolt insertion hole 36c, and screwed in the internal thread hole 15g of the boss portion 15f of the plate wall portion 15b, thereby fixing the control cover 36 to the plate wall portion 15b.

The circuit board 37 has a generally rectangular shape, wherein electronic components 38 are mounted to respective specific locations on the circuit board 37. The circuit board 37 has longitudinal end portions formed with four fixation holes 37a extending through, wherein the fungiform head portion 29a of each column 29 is elastically deformed and inserted in the corresponding fixation hole 37a. The circuit board 37 contains a bus bar which is connected to lead lines 23a of the coils 23 of the stator 11 via terminals.

The following describes how the electric water pump 1 is operated and produces advantageous effects. First, components, such as the support shaft 35, the rotor 12, and the impeller 8, are assembled in the pump housing 5 and the motor housing 6, and the pump housing 5 is fixed to the lower end portion of the base wall portion 15a of the outer wall 15 by the bolts 17.

Then, for positioning and fixing the stator 11 in the accommodation space 20 of the motor housing 6 by means of the stator holder 24, the stator 11 is inserted through the upper end opening 20a, which is located on the upper side in FIG. 1, and accommodated in the accommodation space 20. This causes the lower end face 21c of the outer periphery of the stator core 21 to be seated on the upper face of the seat portion 15h formed in the inner peripheral face of the base wall portion 15a, and thereby restricts further axial movement of the stator core 21.

When the stator 11 is inserted into the accommodation space 20 as described above, the projection 21a of the outer peripheral face of the stator core 21 is positioned to correspond to the recess 18 of the inner peripheral face of the base wall portion 15a of the outer wall 15, and inserted axially and fitted with the recess 18. This causes the stator 11 to be prevented from rotating freely in the circumferential direction, and held in a predetermined position in the axial direction and in a predetermined position in the rotational direction.

Thereafter, the stator holder 24 is held and the leg portions 26 side thereof is inserted via the upper end opening 20a into the accommodation space 20, while the rotational position of the stator holder 24 is adjusted such that the fitting projections 28 correspond in position to the grooves 19, and are fitted with the grooves 19.

Then, with the tip end portion 26b of each leg portion 26 of the stator holder 24 in contact with the upper end face 21b of the stator core 21, the base portion 25 of the stator holder 24 is pressed toward the stator 11. This causes each leg portion 26 to produce an elastic force via the slits 31, and thereby press the stator core 21 onto the seat portion 15h. Under this condition, the fitting projections 28 are fixed to the grooves 19 by vibration welding. This serves to cause the stator 11 to be positioned and fixed elastically in the axial direction (in the thrust direction).

Next, as shown in FIG. 1, the circuit board 37, to which the electronic component 38 is mounted beforehand, is pressed with the fixation holes 37a positioned to correspond to the fungiform head portions 29a of the columns 29 of the stator holder 24, so that the circuit board 37 is mechanically fixed to the columns 29 by snap fitting. The circuit board 37 may be fixed to the columns 29 before the leg portions 26 of the stator holder 24 are inserted into the accommodation space 20.

Thereafter, the control cover 36 is fixed to the plate wall portion 15b of the outer wall 15 by the four bolts 39, completing the overall process of assembling the electric water pump 1.

According to the assembling of the stator 11 to the motor housing 6 described above, by means of the stator holder 24, the stator 11 can be fixed in the accommodation space 20 of the motor housing 6 while being positioned in the thrust direction. Specifically, the stator holder 24 serves to press the stator 11 accommodated in the accommodation space 20 of the motor housing 6 toward the seat portion 15h, wherein the fitting projections 28 are fitted with the grooves 19 and the leg portions 26 are elastically deformed and brought into elastic contact with the upper end face 21b in the axial direction of the stator core 21. Under this condition, the fitting projections 28 are fixed to the grooves 19 by vibration welding. Accordingly, the stator holder 24 serves to reliably fix the stator 11 while preventing the stator 11 from moving in the thrust direction inside the accommodation space 20.

Since the stator 11 can be fixed in the motor housing 6 only by means of the stator holder 24, it is possible to eliminate the necessity of management of a complicated assembling process, and also reduce the number of assembling operations, and facilitate the overall assembling process, in contrast to conventional systems as discussed above.

This serves to improve the efficiency of the assembling process and reduce the manufacturing cost.

The provision of the slits 31, which are formed on both sides of the projecting portion 25a to extend continuously from the fixed end portion 26a of the leg portion 26 to the point in proximity to the projecting portion 25a, serves to apply an elastic force to the leg portions 26 of the stator holder 24 and thereby allow elastic deformation of the leg portions 26 effectively. This makes it possible to produce a sufficient elastic force to hold the stator 11. Since the stator 11 is held elastically by the elastic force of the leg portions 26 of the stator holder 24, it is possible to suppress vibration transmission by the leg portions 26 effectively.

As described above, when the stator holder 24 is inserted into the accommodation space 20 of the motor housing 6, the fitting between the fitting projections 28 and the grooves 19 serves to position the stator holder 24 in the radial direction with respect to the motor housing 6, and the welding between the fitting projections 28 and the grooves 19 serves to establish a strong coupling between the stator holder 24 and the motor housing 6.

The feature that the motor housing 6 and the stator holder 24 are made of the same synthetic resin, serves to easily fix the fitting projections 28 to the grooves 19 by vibration welding.

The feature that the motor housing 6 is not made of metal but made of synthetic resin, serves to sufficiently suppress the occurrence of an iron loss due to a magnetic flux leaking from the stator 11. This serves to suppress the motor efficiency of the electric motor section 3 from being adversely affected.

The feature that the motor housing 6 and the stator holder 24 are made of synthetic resin and welded together, results in easiness of fixing operation, and also serves to suppress heat of the electric motor section 3 and heat of cooling water from being transmitted to the circuit board 37.

As shown in FIG. 1, when the base portion 25 of the stator holder 24 is placed to be in contact with the periphery of the upper end opening 20a of the accommodation space 20 of the outer wall 15, the tubular wall 30 is spigot-fitted with the inner peripheral face of the upper end opening 20a of the accommodation space 20 of the outer wall 15, so that the stator holder 24 is positioned in the radial direction. This serves to make it possible to easily and reliably position the stator holder 24 with respect to the outer wall 15 in the radial direction, and also serves to enhance the rigidity of the base portion 25 because the tubular wall 30 serves as a reinforcing rib for the base portion 25.

When the stator 11 is inserted into the accommodation space 20 in the axial direction, the projection 21a of the stator core 21 is positioned in the circumferential direction, inserted in the axial direction, and fitted with the recess 18 of the outer wall 15, so that the stator 11 is positioned in the circumferential direction and prevented from moving in the circumferential direction. This serves to make it possible to easily assemble the stator 11, and reliably position the stator 11 in the accommodation space 20 along with the support in the axial direction by the stator holder 24.

In the present embodiment, the fitting projections 28 of the stator holder 24 are fixed to the grooves 19 of the motor housing 6 by vibration welding. However, this fixation may be implemented by an alternative process such as hypersonic vibration welding, or thermal welding, or other welding methods.

Also, this fixation may be replaced with fixation between the underside of the base portion 25 and the periphery of the upper end opening 20a of the accommodation space 20 by welding.

The pump section 2 is not limited to the form described above, but may be implemented by one of various configurations.

The entire contents of Japanese Patent Application 2023-145716 filed Sep. 8, 2023 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. An electric water pump comprising:
an impeller;
a rotor coupled with the impeller;
a stator arranged coaxially with the rotor;
a motor housing structured to accommodate the rotor and the stator; and
a stator holder structured to hold the stator;
wherein the motor housing includes an inner wall, an outer wall, and a connection wall;
wherein the inner wall has a bottomed tubular shape and forms a first accommodation space radially inside the inner wall, wherein the first accommodation space accommodates the rotor;
wherein the outer wall has a tubular shape, is arranged radially outside the inner wall, encompasses the inner wall, and forms a second accommodation space between the inner wall and the outer wall, wherein the second accommodation space has a tubular shape and accommodates the stator;
wherein the connection wall connects a first axial end portion of the inner wall to a first axial end portion of the outer wall radially, wherein the first axial end portion of the inner wall faces the impeller, and wherein the first axial end portion of the outer wall faces the impeller;
wherein the stator holder includes a base portion and holding portions;
wherein the base portion has an annular shape and is fixed to an outer axial end portion of the outer wall opposite to the first axial end portion of the outer wall;
wherein each of the holding portions has a first axial end portion fixed to the base portion and a second axial end portion in elastic contact with the stator, and is structured to hold the stator;
wherein each of the holding portions includes a pair of slits on respective sides of the first axial end portion of the each of the holding portions;
wherein the pair of slits extend radially and allow the first axial end portion of the each of the holding portions to be deformed axially;
wherein each of the holding portions is provided with a projecting portion of the base portion;
wherein the projecting portion is located radially outside of the first axial end portion of each of the holding portions, and projects radially outwardly; and
wherein each of the pair of slits extends from the respective side of the first axial end portion of the each of the holding portions into a predetermined proximity to the projecting portion.

2. The electric water pump as claimed in claim 1, wherein each of the holding portions includes a leg portion extending to an axial end portion of the stator.

3. The electric water pump as claimed in claim 1, wherein:
the motor housing is integrally formed of synthetic resin;
the stator holder is integrally formed of synthetic resin; and
the base portion of the stator holder is welded to the outer axial end portion of the outer wall.

4. The electric water pump as claimed in claim 1, wherein:
the stator holder includes a tubular wall extending axially from an inner periphery of the base portion toward an axial end portion of the stator; and
the tubular wall is structured to be axially inserted radially inside the outer end portion of the outer wall, and fitted with an inner peripheral face of the outer end portion of the outer wall.

5. The electric water pump as claimed in claim 1, wherein the motor housing, the rotor, and the stator form a three-phase brushless electric motor.

6. An electric water pump comprising:
an impeller;
a rotor coupled with the impeller;
a stator arranged coaxially with the rotor;
a motor housing structured to accommodate the rotor and the stator; and
a stator holder structured to hold the stator;
wherein the motor housing includes an inner wall, an outer wall, and a connection wall;
wherein the inner wall has a bottomed tubular shape and forms a first accommodation space radially inside the inner wall, wherein the first accommodation space accommodates the rotor;
wherein the outer wall has a tubular shape, is arranged radially outside the inner wall, encompasses the inner wall, and forms a second accommodation space between the inner wall and the outer wall, wherein the second accommodation space has a tubular shape and accommodates the stator;
wherein the connection wall connects a first axial end portion of the inner wall to a first axial end portion of the outer wall radially, wherein the first axial end portion of the inner wall faces the impeller, and wherein the first axial end portion of the outer wall faces the impeller;
wherein the stator holder includes a base portion and holding portions;
wherein the base portion has an annular shape and is fixed to an outer axial end portion of the outer wall opposite to the first axial end portion of the outer wall;
wherein each of the holding portions has a first axial end portion fixed to the base portion and a second axial end portion in elastic contact with the stator, and is structured to hold the stator;
wherein the outer axial end portion of the outer wall includes an outer face including at least two grooves;
wherein each of the at least two grooves extends tangentially of the outer wall;
wherein the stator holder includes at least two mount portions at an outer periphery of the base portion;
wherein each of the at least two mount portions includes a first end face facing the stator, wherein the first end face is formed with a fitting projection;
wherein the fitting projection is structured to be radially inserted into, fitted with, and welded to a corresponding one of the at least two grooves of the outer wall;
wherein each of the at least two mount portions includes a second end face opposite to the first end face, wherein the second end face is provided with columns;
wherein each of the columns corresponds in position to the fitting projection as viewed axially; and
wherein each of the columns includes a tip end portion provided with an engaging portion structured to be inserted into and elastically engaged with a fixation hole formed in a circuit board.

7. An electric water pump comprising:
an impeller;
a rotor coupled with the impeller;
a stator arranged coaxially with the rotor;
a motor housing structured to accommodate the rotor and the stator; and
a stator holder structured to hold the stator;
wherein the motor housing includes an inner wall, an outer wall, and a connection wall;
wherein the inner wall has a bottomed tubular shape and forms a first accommodation space radially inside the inner wall, wherein the first accommodation space accommodates the rotor;
wherein the outer wall has a tubular shape, is arranged radially outside the inner wall, encompasses the inner wall, and forms a second accommodation space between the inner wall and the outer wall, wherein the second accommodation space has a tubular shape and accommodates the stator;
wherein the connection wall connects a first axial end portion of the inner wall to a first axial end portion of the outer wall radially, wherein the first axial end portion of the inner wall faces the impeller, and wherein the first axial end portion of the outer wall faces the impeller;
wherein the stator holder includes a base portion and holding portions;
wherein the base portion has an annular shape and is fixed to an outer axial end portion of the outer wall opposite to the first axial end portion of the outer wall;
wherein each of the holding portions has a first axial end portion fixed to the base portion and a second axial end portion in elastic contact with the stator, and is structured to hold the stator;
wherein the outer wall includes an inner peripheral face facing the second accommodation space;
wherein the inner peripheral face of the outer wall includes a recess extending axially;
wherein the stator includes an outer peripheral face including a projection projecting radially and extending axially; and
wherein the recess of the outer wall and the projection of the stator are structured to allow the projection of the stator to be inserted axially into and fitted with the recess of the outer wall.

* * * * *